United States Patent
Korba et al.

(10) Patent No.: US 8,022,575 B2
(45) Date of Patent: Sep. 20, 2011

(54) DAMPING ELECTROMAGNETIC OSCILLATIONS IN POWER SYSTEMS

(75) Inventors: Petr Korba, Turgi (CH); Mats Larsson, Baden-Dätwil (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/560,824

(22) Filed: Sep. 16, 2009

(65) Prior Publication Data
US 2010/0023179 A1 Jan. 28, 2010

Related U.S. Application Data

(63) Continuation of application No. PCT/EP2008/053713, filed on Mar. 28, 2008.

(60) Provisional application No. 60/908,595, filed on Mar. 28, 2007.

(51) Int. Cl.
*H02J 3/24* (2006.01)

(52) U.S. Cl. ............ 307/102; 700/297; 363/39; 363/40; 363/41; 363/42; 363/43; 363/44; 363/45; 363/46; 363/47; 363/48; 327/551; 327/552; 333/167; 333/168; 333/169; 333/170; 333/171; 333/172; 333/173; 333/174; 333/175; 333/176; 333/177; 333/178; 333/179; 333/180; 333/181; 333/182; 333/183; 333/184; 333/185

(58) Field of Classification Search ............ None
See application file for complete search history.

(56) References Cited

U.S. PATENT DOCUMENTS
5,642,007 A * 6/1997 Gyugyi et al. ............ 307/102

FOREIGN PATENT DOCUMENTS
| | | |
|---|---|---|
| EP | 1 737 098 A1 | 12/2006 |
| WO | WO 00/57529 A1 | 9/2000 |
| WO | WO 2006/131017 A2 | 12/2006 |

OTHER PUBLICATIONS

Application of FACTS Devices for Damping of Power System Oscillations, to Sadikovic, Jun. 27, 2005.*
Fast Passivity Enforcement for Pole-Residue Models by Perturbation of Residue Matrix Eigenvalues, to Bustavsen, Oct. 4 2008.*
Extracting the dominant damping mode from multi frequency time response, to Bradley et al., Sep. 1, 1998.*
General approach to control-configured plant (CCP) design-redesign, to Ju et al., Mar. 1999.*
Power Oscillation Damping Using FACTS Devices, Modal Controllability, Observability in Local Signals, and Location of Transfer Function Zeros, to Mhaskar, Feb. 2006.*

(Continued)

*Primary Examiner* — Rexford N Barnie
*Assistant Examiner* — Justen Fauth
(74) *Attorney, Agent, or Firm* — Buchanan Ingersoll & Rooney PC

(57) ABSTRACT

Exemplary embodiments of the present disclosure provide a method and controller for damping multimode electromagnetic oscillations in electric power systems which interconnect a plurality of generators and consumers. The controller for damping such oscillations includes a phasor measurement unit (PMU) and a power oscillation damper (POD) controller. Each oscillating mode signal is damped and then superposed to derive a control signal. A feedback controller is used to feedback the control signal to a power flow control device in the power system.

12 Claims, 8 Drawing Sheets

OTHER PUBLICATIONS

Topography Adaptive Filtering of Phase Image Based on Residue Matrix, to Yang et al., Apr. 10, 2007.*

Active Damping in HDD Actuator, to Huang, Mar. 2001.*

International Search Report (PCT/ISA/210) dated Dec. 11, 2008.

Written Opinion (PCT/ISA/237) dated Dec. 11, 2008.

E. Lerch et al., "Advanced SVC Control for Damping Power System Oscillations", IEEE Transactions on Power Systems, vol. 6, No. 2, May 1991, pp. 524-535.

S.A. Nabavi Niaki et al., "Application of Unified Power Flow Controller (UPFC) for Damping Interarea Oscillations", IEEE/PES Transmission and Distribution Conference and Exhibition, vol. 1, Oct. 6, 2002, pp. 348-353.

Rusejla Sadikovic et al., "Application of FACTS Devices for Damping of Power System Oscillations", Power Tech, Jun. 27, 2005, pp. 1-6.

Notification Concerning Transmittal of International Preliminary Report on Patentability (Chapter I of the Patent Cooperation Treaty) and the Written Opinion of the International Searching Authority issued in corresponding International Application No. PCT/EP2008/053713 Forms (PCT/IB/373 and PCT/ISA/237) dated Oct. 8, 2009.

* cited by examiner

# DAMPING ELECTROMAGNETIC OSCILLATIONS IN POWER SYSTEMS

RELATED APPLICATIONS

This application is a continuation application under 35 U.S.C. §120 of PCT/EP2008/053713, which was filed as an International Application on Mar. 28, 2008 designating the U.S., and which claims the benefit under 35 U.S.C. §119 of U.S. Provisional Patent No. 60/908,595 filed on Mar. 28, 2007. The entire contents of each prior application are hereby incorporated by reference in their entireties.

FIELD

The present disclosure relates to the field of damping multimode electromagnetic oscillations in electric power systems interconnecting a plurality of generators and consumers.

BACKGROUND INFORMATION

In the wake of the ongoing deregulations of the electric power markets, load transmission and wheeling of power from distant generators to local consumers has become common practice. As a consequence of the competition between utilities and the emerging need to optimize assets, increased amounts of electric power are transmitted through the existing networks, invariably causing congestion, transmission bottlenecks and/or oscillations of parts of the power transmission systems. In this regard, electrical transmission networks are highly dynamic. In general, electromagnetic oscillations in electric power systems comprising several alternating current generators have a frequency of less than a few Hz and are considered to be acceptable as long as they decay. They are initiated by the normal small changes in the system load, and they are a characteristic of any power system.

However, insufficiently damped oscillations may occur when the operating point of the power system is changed, for example, due to a new distribution of power flows following a connection or disconnection of generators, loads and/or transmission lines. Likewise, the interconnection of several existing power grids, even if one or more of the existing grids do not individually present any poorly damped oscillations prior to their interconnection, may give rise to insufficiently damped oscillations. In these cases, an increase in the transmitted power of a few MW may make the difference between stable oscillations and unstable oscillations which have the potential to cause a system collapse or result in lost of synchronism, lost of interconnections and ultimately the inability to supply electric power to the customer. Appropriate monitoring of the power system can help a network operator to accurately assess power system states and avoid a total blackout by taking appropriate actions such as the connection of specially designed oscillation damping equipment.

Electric power transmission and distribution systems or networks comprise high-voltage tie lines for connecting geographically separated regions, medium-voltage lines, and substations for transforming voltages and for switching connections between lines. For managing the network, it is known to utilize Phasor Measurement Units (PMU). PMUs provide time-stamped local information about the network, such as currents, voltages and load flows. A plurality of phasor measurements collected throughout the network by PMUs and processed at a central data processor can provide a snapshot of the overall electrical state of the power system.

Patent Application EP-A 1 737 098 describes the combined voltage or power flow control and damping of single mode electromagnetic oscillations in an electric power system by Flexible AC Transmission System (FACTS) devices. To this end, information about a state or operating point of the power system is generated from suitable second system signals, and a control parameter of a FACTS controller is derived therefrom. The control parameter and first system signals are used in the calculation of a control command defining the settings of the FACTS device. Following a change in the state of the power system, such as a change in the topology of a transmission network, poorly damped or even unstable oscillations are avoided by appropriate re-tuning of the control parameter of the damping or stabilizing equipment.

Exemplary FACTS devices comprise power semiconductor components and include, by way of example, Static-Var Compensators (SVCs), Unified Power Flow Controller (UPFC), Thyristor-Controlled Series Capacitors (TSCSs), thyristor controlled phase-shifting transformers (TCPST), impedance modulators, and series compensation capacitors.

Such known technologies enable damping control of a selected single mode oscillation based on a single feedback signal. This is known as a single-input single-output solution (SISO). It has been found that electromechanical oscillations in electric power networks also take the form of a superposition of multiple oscillatory modes. These multiple oscillatory modes create similar problems to the single mode oscillations and thus have the potential to cause a collapse of the electric power network. Furthermore, in situations where a Power Oscillation Damping (POD) controller is used to stabilize a single selected oscillatory mode, this may often have the effect of destabilizing the other oscillatory modes present, for example, a second dominant mode, which is subsequently damped less than the first dominant mode. Thus, it can be seen that the second dominant mode (and any other mode) is negatively impacted by the performance of the SISO POD controller which is tuned to improve the damping of the first dominant oscillatory mode.

With reference to the known technologies which enable damping control of single mode oscillations, FIG. 1 shows a complex frequency domain graph of the effect of a known SISO POD controller utilizing local feedbacks. In such a complex frequency domain graph (in the s-plane), the x-axis represents the real part of s (which is absolute modal damping) and the y-axis represents the imaginary part of s (which is modal frequency in radians per second) where the s-plane transforms are commonly known as Laplace transforms; hence in the s-plane, multiplying by s has the effect of differentiating in the corresponding real time domain and dividing by s has the effect of integrating. Each point on the s-plane represents an eigenvalue or a transfer function pole. The arrow 10 closest to the x-axis represents the improvement of damping of the first dominant oscillatory mode, because the change of the eigenvalue is directed towards the left half of the complex plane. The parallel arrow 12 further from the x-axis represents the deterioration in damping of the second dominant oscillatory mode (increasing oscillations in the time domain) which is indicated by the change of the eigenvalue towards the right half of the complex plane.

The article "Application of FACTS Devices for Damping of Power System Oscillations", by R. Sadikovic et al., proceedings of the Power Tech conference 2005, Jun. 27-30, St. Petersburg RU, is incorporated herein by reference. This article addresses the selection of the proper feedback signals and the subsequent adaptive tuning of the parameters of a power oscillation damping (POD) controller in case of changing operating conditions. The selection is based on a linearized system model, the transfer function G(s) of which is being expanded into a sum of N residues:

$$G(s) = \sum_{i=1}^{N} \frac{R_i}{(s - \lambda_i)}$$

The N eigenvalues $\lambda_i$ correspond to the N oscillation modes of the system, whereas the residue $R_i$ for a particular mode gives the sensitivity of that mode's eigenvalue to feedback between the output and the input of the system.

SUMMARY

An exemplary embodiment provides a method of damping multiple electromagnetic oscillations in a power system. The exemplary method comprises obtaining phasor data signals from at least one power system location, analyzing each oscillating mode by modal analysis, extracting each oscillating mode from within said signals, damping each oscillating mode based on the analysis, and applying a control signal derived from the damped oscillating mode to a power flow control device in the power system. According to an exemplary embodiment, the step of extracting an oscillating mode comprises selecting a mode, and determining a residue having a maximal norm within a matrix of residues of the extracted mode.

An exemplary embodiment provides a controller for damping multiple electromagnetic oscillations in a power system (G). The exemplary controller can comprise at least one phasor measurement unit (PMU) obtaining phasor data signals including oscillating mode signals, and at least one power oscillation damper (POD) controller for receiving and damping each oscillating mode signal. The exemplary controller also includes a superposition means for receiving and summing the damped signals and deriving a control signal, and a feedback controller (H) to feedback the control signal to a power flow control device in the power system (G). In addition, the exemplary controller can comprise means for extracting each oscillating mode within the phasor data signals, wherein the extracting means comprise a mode selection means and a means for determining a residue having a maximal norm within a matrix of residues of the extracted mode, respectively.

An exemplary embodiment provides a computer-readable recording medium having recorded thereon a computer program for damping multiple electromagnetic oscillations in a power system. The computer program, when executed by a computer, causes a computer to carry out operations that can include: obtaining phasor data signals including oscillating mode signals; extracting each oscillating mode signal within the phasor data signals; receiving and damping each oscillating mode signal; receiving and summing the damped signals and deriving a control signal; and feeding back the control signal to a power flow control device in the power system. According to an exemplary embodiment, the extracting operation can include selecting a mode and determining a residue having a maximal norm within a matrix of residues of the extracted mode, respectively.

BRIEF DESCRIPTION OF THE DRAWINGS

Additional features, advantages and refinements of the present disclosure are described in more detail below with reference to exemplary embodiments which are illustrated in the attached drawings, in which.

The reference symbols used in the drawings, and their meanings, are listed in summary form in the list of reference symbols. Identical parts are provided with the same reference symbols in the figures, unless otherwise noted.

DETAILED DESCRIPTION

Figure 1:
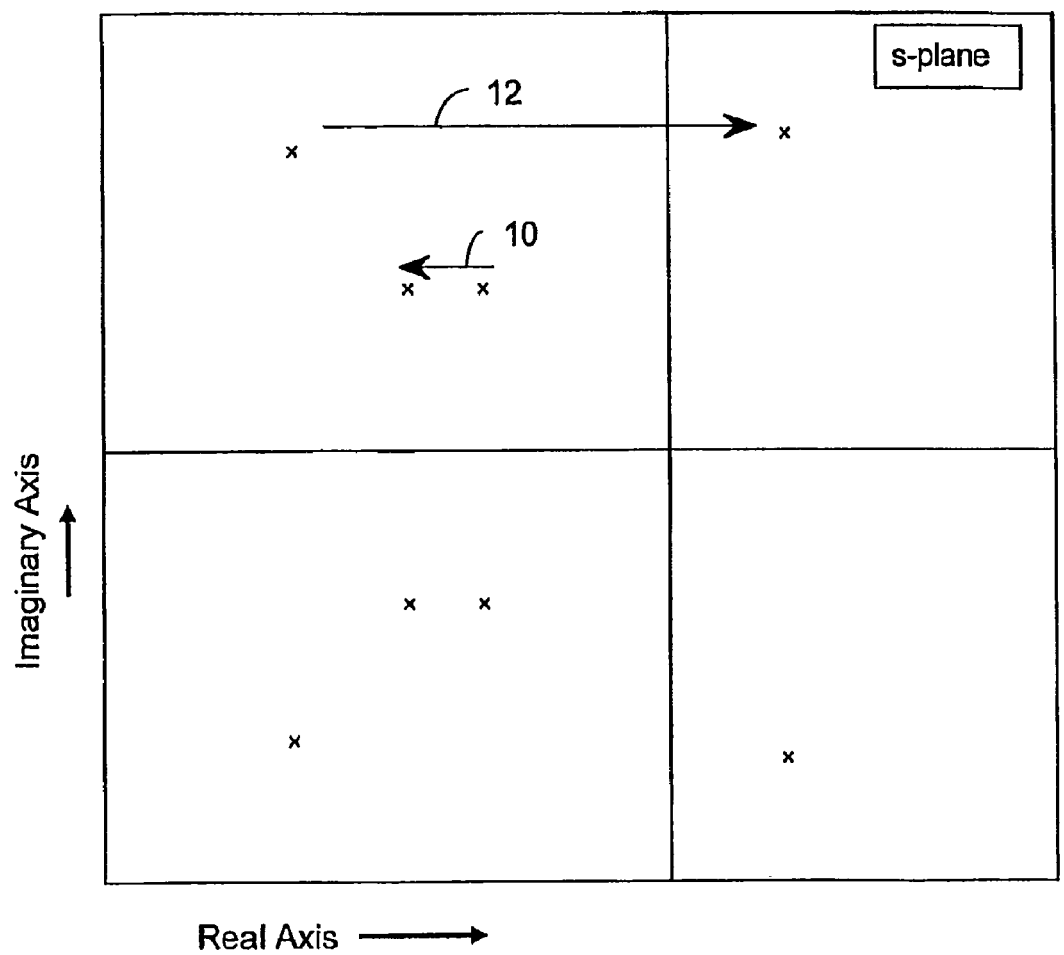
FIG. 1 graphically illustrates the impact in the complex frequency domain of a known SISO POD controller which utilizes local feedback signals for control according to the prior art.

Exemplary embodiments of the present disclosure damp multiple electromagnetic oscillations in electric power transmission networks in a flexible manner and with minimal additional equipment. Exemplary embodiments provide a method and a controller for damping multiple electromagnetic oscillations in a power system.

According to a first exemplary aspect of the present disclosure, a method is provided for damping multiple electromagnetic oscillations in a power system. The method can include, for example, obtaining phasor data signals from at least one power system location, extracting each oscillating mode from within the signal and analyzing each oscillating mode, and damping each oscillating mode based on the analysis and applying a control signal derived from the damped oscillating mode to a power flow control device in the power system. According to an exemplary embodiment, the step of extracting an oscillating mode can include selection and mode residue maximisation.

According to an exemplary embodiment, the method can also include superposing two or more damped oscillating modes to obtain a superposition signal, and applying a control signal derived from the superposition signal to a power flow control device in the power system. Thus, the method can advantageously be utilized for damping a single oscillating mode or multiple oscillating modes.

According to an exemplary embodiment, the step of mode selection can include obtaining modal controllability and modal observability. Further, each mode residue can represent a product of modal controllability and modal observability.

According to a second exemplary aspect of the present disclosure, a controller is provided for damping multiple electromagnetic oscillations in a power system. The exemplary controller can include, for example, at least one phasor measurement unit obtaining phasor data signals including oscillating mode signals, at least one power oscillation damper controller for receiving and damping each oscillating mode signal, a superposition means for receiving and summing the damped signals and deriving a control signal, and a feedback controller to feedback the control signal to a power flow control device in the power system. According to an exemplary embodiment, the controller can include a mode selection means and a residue maximisation means for extracting each oscillating mode within the phasor data signals.

Power systems are large scale systems having numerous dynamic states, oscillatory modes and measurable inputs and outputs. Therefore, there are many possible signals that may be chosen as a feedback signal. Exemplary embodiments of the present disclosure ensure proper selection of the feedback signal and controller design procedure to enable at least one oscillatory mode to be effectively damped. It should be noted that the controller of the present disclosure may also be referred to within this description as a compensator.

According to an exemplary embodiment, the at least one power oscillation damper controller may be a MIMO power oscillation damper controller, a SISO power oscillation damper controller, a SIMO power oscillation damper controller or a MISO power oscillation damper controller, for example.

According to an exemplary embodiment, the controller can operate on a wide-area monitoring and control platform.

According to another exemplary embodiment, the controller can operate on a phasor measurement unit.

According to another exemplary embodiment, the controller can operate on a power flow control device.

The controller of the present disclosure may be implemented as computer processing hardware or circuitry of a digital computer (e.g., CPU) executing software recorded on a computer-readable recording medium (e.g., non-volatile memory, such as a hard disk, optical recording medium, flash memory, etc.) in communication with the digital computer, or as a hard-wired implementation using techniques such as EPROM etc. For example, the controller of the present disclosure can be implemented by a processor of a computer executing a computer program recorded on a computer-readable recording medium for damping multiple electromagnetic oscillations in a power system. Advantageously, the present disclosure has relatively low complexity, but efficiently solves the problem of damping multiple electromagnetic oscillations in electric power transmission networks.

Figure 2:
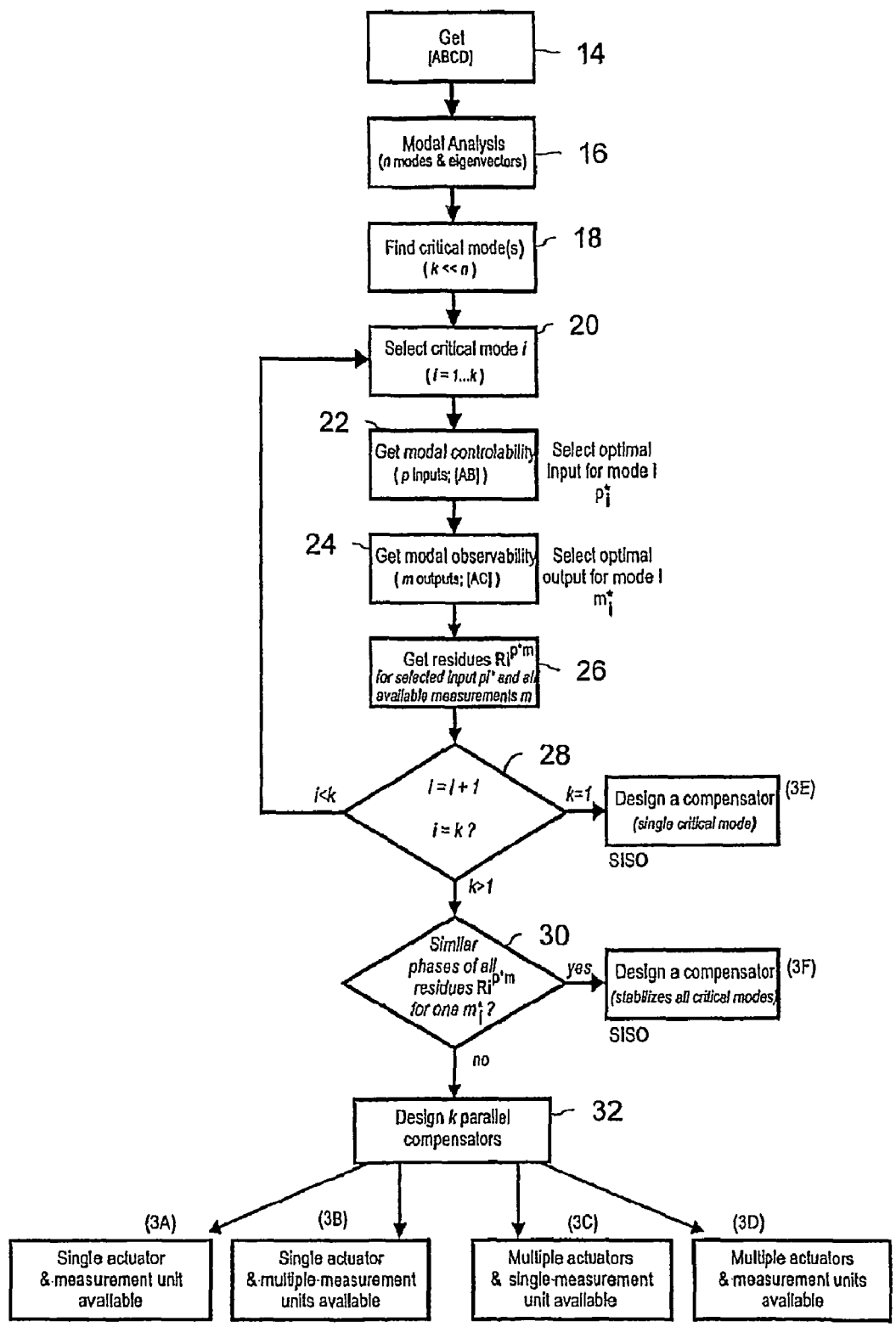
FIG. 2 is a flow diagram of an exemplary design method of the controller according to at least one embodiment of the present disclosure.

FIG. 2 shows a flow diagram of an exemplary method that enables simultaneous damping of multiple oscillatory modes in a power system according to at least one embodiment of the present disclosure. The following derivation of the algorithm of the present disclosure is included for completeness. In step 14, a mathematical model of a power system $$\dot{x}=f(x,t)$$

$$y=g(x,t) \qquad (1)$$

is linearized around a point of interest $x=x_0$, thus resulting in $$\Delta\dot{x}(t)=A\Delta x(t)+B\Delta u(t)$$

$$\Delta y(t)=C\Delta x(t)+D\Delta u(t) \qquad (2)$$

(for sake of simplicity and without loss of generality of the obtained results, the direct through matrix D can be assumed to be a zero matrix in the equations written from here on).

In step 16, modal analysis transforms the model into modal coordinates obtaining n eigenvalues $\lambda_k$ and corresponding left $l_k$ and right $r_k$ eigenvectors (k=1, ..., n) fulfilling (3) and (4).

$$det(A-\lambda_k I)=0$$

$$Ar_k=r_k\lambda_k \qquad (3)$$

Note that if the state space matrix A has n distinct eigenvalues, $\Lambda$, R and L are respectively the diagonal matrix of eigenvalues and matrices of right and left eigenvectors.

$$AR=R\cdot\Lambda$$

$$L^T A=\Lambda L^T$$

$$R=L^{-T} \qquad (4)$$

The following similarity transformation (5) is introduced and (2) is rewritten as (6)

$$\Delta x=Tz \qquad (5)$$

$$\dot{z}(t)=T^{-1}ATz(t)+T^{-1}B\Delta u(t)$$

$$\Delta y(t)=CTz(t) \qquad (6)$$

Selecting the transform matrix T equals R (the matrix of right eigenvectors of A), i.e. $\Delta x=Rz$, (6) becomes (7).

$$\dot{z}(t)=\Lambda z(t)+\tilde{B}\Delta u(t)$$

$$\Delta y(t)=\tilde{C}z(t)$$

where $\tilde{C}=CR$, $\tilde{B}=LB$ and $\lambda_k=\alpha_k+i\omega_k$ \qquad (7)

In step 18 of FIG. 2, the critical modes are found. Next, the critical mode i is selected in step 20. The set of all complex eigenvalues $\lambda_k$ characterizes oscillations. Rather than the absolute damping $\alpha_k$, a practical measure for the assessment of the damping of oscillations is the relative damping $\xi_k$ given by (8), which yields normalized values in percent $$\xi_k \in \langle -100; +100 \rangle$$

$$\xi_k = -100\frac{\alpha_k}{\|\lambda_k\|}\% \qquad (8)$$

A working power system is stable; this means in terms of the relative damping (8) that condition (9) holds; it is useful to sort all all $\xi_k$ (with all corresponding eigenvalues and eigenvectors $\Lambda$, R and L). Denote the minimum as $\xi_1$ and designate it (with the corresponding frequency $\omega_k$) as the dominant mode.

$$\min_k \xi_k > 0, k = 1, \ldots, n \qquad (9)$$

All the other modes of interest are those having the lowest indices (corresponds to poor damping). As indicated in steps 22 and 24 of the exemplary method, modal controllability and observability are obtained and the optimal input and output for mode I are selected.

It should be noted that in complex analysis, the "residue" is a complex number which describes the behavior of line integrals of a meromorphic function around a singularity. Residues may also be used to compute real integrals, and allow the determination of more complicated path integrals via the residue theorem. Each residue represents a product of modal observability and controllability.

For any selected mode of interest $\lambda_k$, the following set of residues are calculated 26; i.e. a matrix RES of the dimension m×r, with respect to all possible inputs and outputs as follows:

$$RES(\lambda_k)=\tilde{C}(:,k)\tilde{B}(k,:)=[res_{ji}(\lambda_k)]^{m \times r} \qquad (10)$$

With reference to step 28 of the exemplary method illustrate in FIG. 2, it may be envisaged that a partial SISO controller (for a single mode) can be designed as follows:

For the mode of interest, say $\lambda_1$, select the input i and output j so that the corresponding single complex residue $res_{ij}(\lambda_1)$ has the maximal norm among all m×r $RES(\lambda_1)$:

$$\max_{i,j} \|res_{ji}(\lambda_1)\| = \|res_{ji}^{max}(\lambda_1)\| \tag{11}$$

The article "Application of FACTS Devices for Damping of Power System Oscillations", by R. Sadikovic et al., proceedings of the Power Tech conference 2005, Jun. 27-30, St. Petersburg RU, as mentioned previously, shows how to design a SISO controller based on the known sensitivity of the eigenvalue $\lambda_k$ given by (12) subject to closing a control loop between a selected input i and output j via a controller H(s).

$$\Delta\lambda_k = res_{ji}^k(\lambda_k) \tag{12}$$

Select another mode of interest, say $\lambda_2$, $\lambda_3$, ... etc. As illustrated in FIG. 2, it is then possible to return to the step 20 to repeat 20, 22, 24, 26 and 28 steps for the next mode of interest. With reference to step 30, similar phases of all residues for one mode are obtained, which results in the design of a further SISO controller able to stabilize all critical modes.

With reference to step 32 in FIG. 2, k parallel compensators can be designed for k modes with optimal observability of the dominant mode. The various compensators that can be designed are described in the flow chart boxes denoted 3A through 3F in FIG. 2. Actuators 3C, 3D and 3F are MIMO controllers and their output is a superposition of the contributions of the partial SISO controllers, respectively.

When a feedback control H(s) is applied, the eigenvalues $\lambda_i$ of the initial system G(s) are shifted, whereby this shift caused by the controller is proportional to the residue $R_i$. From the desired shifted eigenvalue location $\lambda_{i\,des}$, a controller gain K can thus be computed that is inversely proportional to the residue $R_i$. In the notation of FIGS. 3A through 3E, feedback controller(s) H and power system G is/are interconnected by measured PMU signal(s) (illustrated as arrows from G to H) and actuator(s) (illustrated as arrows from H to G), respectively.

FIGS. 3A through 3E schematically illustrate various exemplary embodiments of the controller of the present disclosure. The number of critical oscillatory modes that need to be stabilized is denoted as k.

Figure 3A:
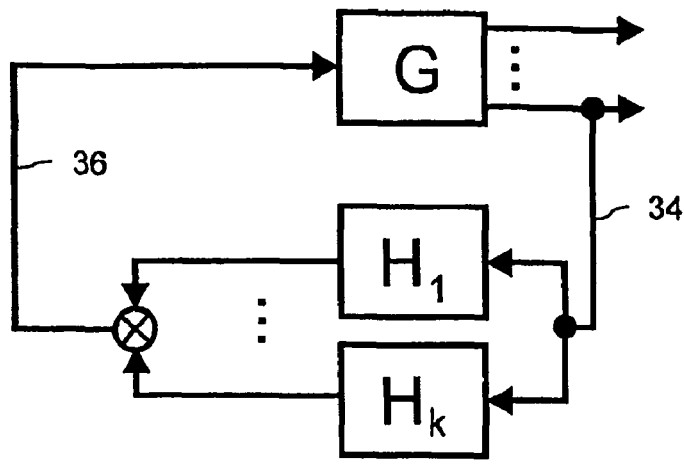
FIG. 3A-FIG. 3F schematically illustrate various exemplary embodiments of the controller of the present disclosure.

FIG. 3A illustrates an exemplary SISO controller comprising a PMU receiving a single input 34 and providing a single output 36 into the actuator. This arrangement may stabilise all critical modes using a single PMU and a single actuator.

Figure 3B:
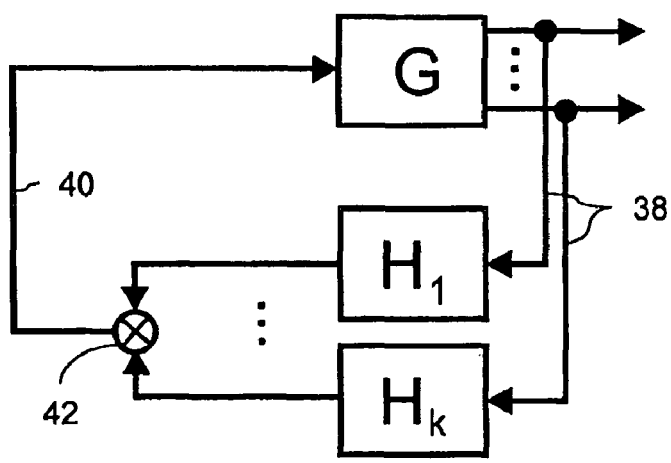

FIG. 3B illustrates an exemplary MISO (Multiple-input Single-Output) controller comprising two or more partial controllers in parallel receiving an input 38 from several different PMUs and yielding a single output 40 for a single actuator. Each PMU provides through a corresponding controller a single input into a summing device 42. The single output of the summing device is input into the actuator. This arrangement damps k modes and it can be applied in cases when a number of different PMU measurements are available. In contrast, the arrangement in FIG. 3A can be applied in cases when only a single PMU is assumed to be installed.

Figure 3C:
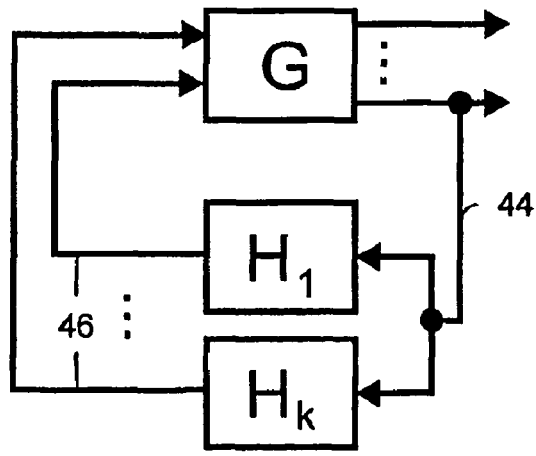

FIG. 3C illustrates an exemplary SIMO (Single-Input Multiple-Output) controller comprising one PMU providing the input signal 44 for k parallel controllers designed to damp k critical modes using k actuators. The PMU provides a single input which is fed back through k controllers and k actuators 46 to the power system. This arrangement stabilises k critical modes.

Figure 3D:
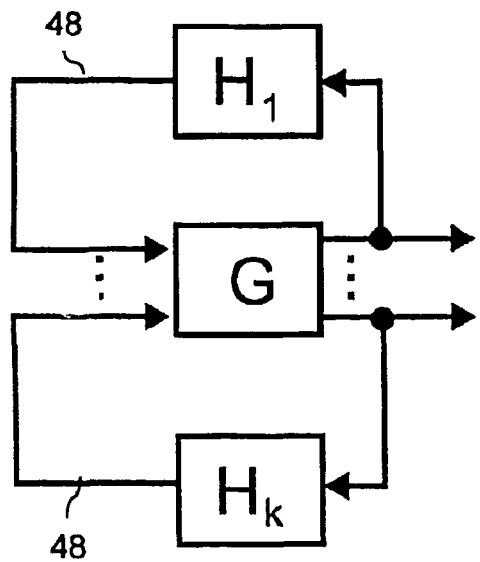

FIG. 3D illustrates an exemplary MIMO (Multiple-input Multiple-Output) controller comprising two or more PMUs, controllers and actuators. Each partial control loop 48 utilizes a PMU measurement and an actuator. In this exemplary embodiment of a controller, no summation or superposition devices are required. This arrangement damps k oscillating modes.

Figure 3E:
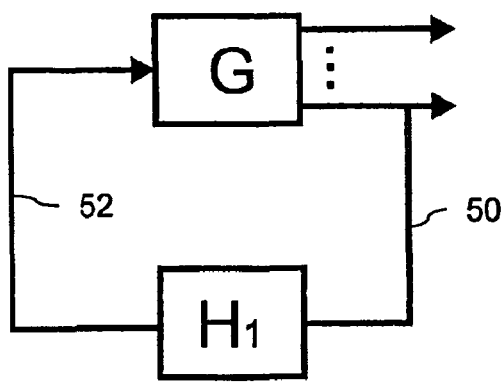

FIG. 3E illustrates an exemplary SISO controller comprising one PMU 50, one controller and one actuator 52. The PMU provides a single measurement which is fed back to the actuator through a single controller. This arrangement explicitly addresses stabilization of a single critical mode.

Figure 3F:
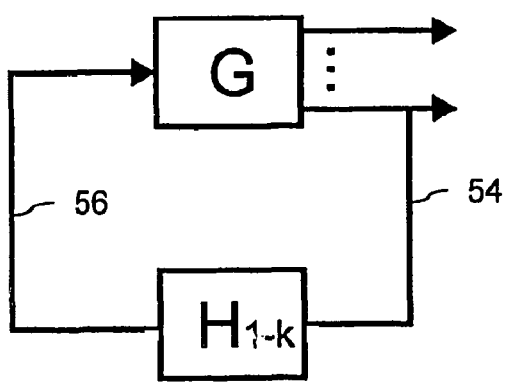

FIG. 3F illustrates an exemplary SISO controller comprising one PMU 54, one controller and one actuator 56. The PMU provides a single measurement which is fed back to the actuator through a single controller. This arrangement addresses stabilization of k critical modes using a simple SISO scheme. This is possible in cases when all corresponding residue angles are similar.

When in use, each of the above embodiments of the MIMO dynamic POD compensator of the present disclosure can function as follows:

Obtaining phasor data from the power system at remote PMUs and inputting signals of an initial disturbed power flow having multiple oscillations into the MIMO, SISO, SIMO and MISO POD controllers.

Extracting each single oscillating mode within the signal by means of a mode selection and residue maximization for each mode. Subsequently inputting each mode into a separate SISO POD controller.

Analysing of the size and type of oscillation in the SISO POD controller.

Damping of the single oscillating mode by the POD and outputting the signal from the SISO POD controller.

Feeding the signals from each parallel SISO POD controller into a summation means or any other type of signal superposition means (utilizing weighted summation, for example).

Transmitting an element of the final damping signal to actuators. Obtaining phasor data from the power system at remote PMUs and the resulting signal for damping multiple oscillatory modes.

According to an exemplary embodiment, a Nyquist diagram can be used in automatic control and signal processing for assessing the stability of a system with feedback. The Nyquist diagram can be represented by a graph in which the gain and phase of a frequency response are plotted. The plot of these phasor quantities shows the phase and the magnitude as the distance and angle from the origin. The Nyquist stability criterion provides a simple test for stability of a closed-loop control system by examining the open-loop system's Nyquist plot. (i.e., the same system including the designed controller, although without closing the feedback loop)

Figure 4:
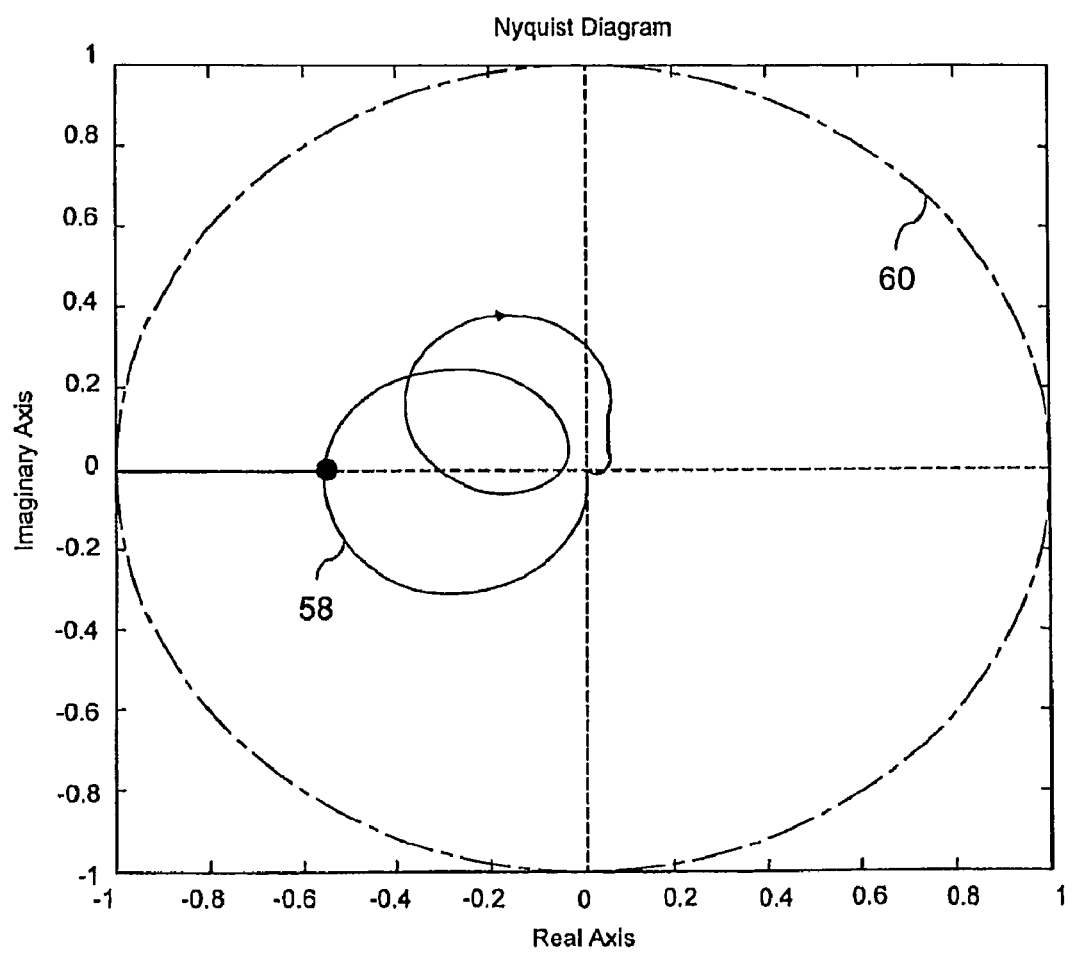
FIG. 4 shows a Nyquist diagram of an optimal control solution based on all available signals.

FIG. 4 shows a Nyquist diagram of an exemplary control solution based on all available signals. It should be noted that remote signals were also included in the selection of the best feedback signals. The black point at (−1,0) 58 denotes the stability. The route of the plot forms two clear loops which do not encircle the stability point (−1,0), and the plot remains entirely within the unit circle 60 (dot-dash line) for all frequencies. Hence, such a control system will have infinite phase/delay stability margin (shown in that it has no intersection with unit circle) and a very large gain stability margin (shown by the relatively large distance between its intersection with the negative x-axis, i.e., the black point and the point (−1,0)).

Figure 5:
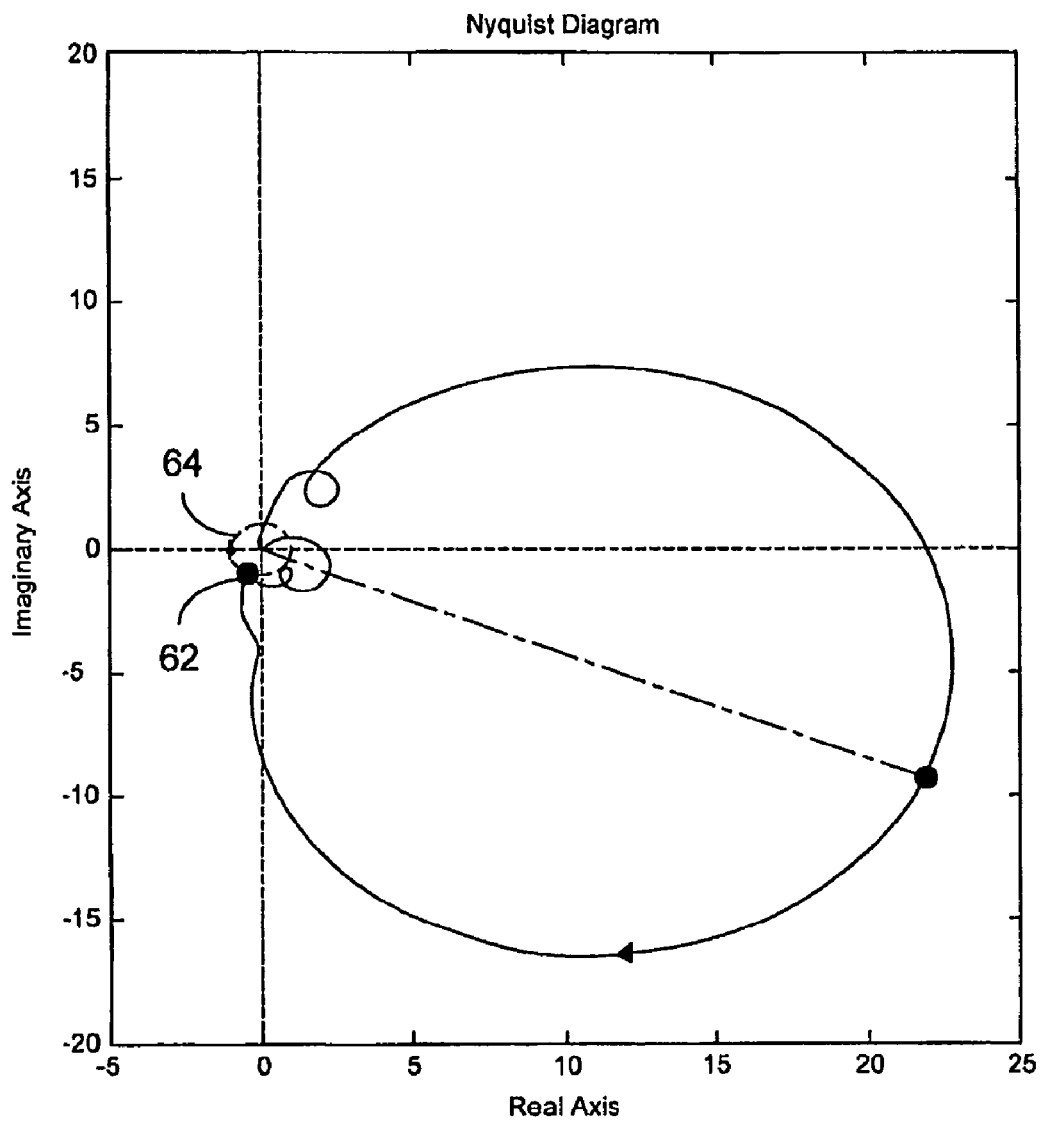
FIG. 5 shows a Nyquist diagram of an optimal control solution based on local signals only.

FIG. 5 shows a Nyquist diagram according to an exemplary embodiment of the best achieved control solution based on local signals only. The black point 62 near the real axis represents the intersection with the unit circle. The route of the plot forms a clear loop which shows that the control system will be stable. The dot-dash line 64 around zero represents the unit circle. This exemplary Nyquist diagram shows that the stability margins are considerably smaller than in the control solution illustrated in FIG. 4 where remote signals were used. Thus, even though the same performance could be achieved in both cases, the local solution is less robust.

Figure 6:
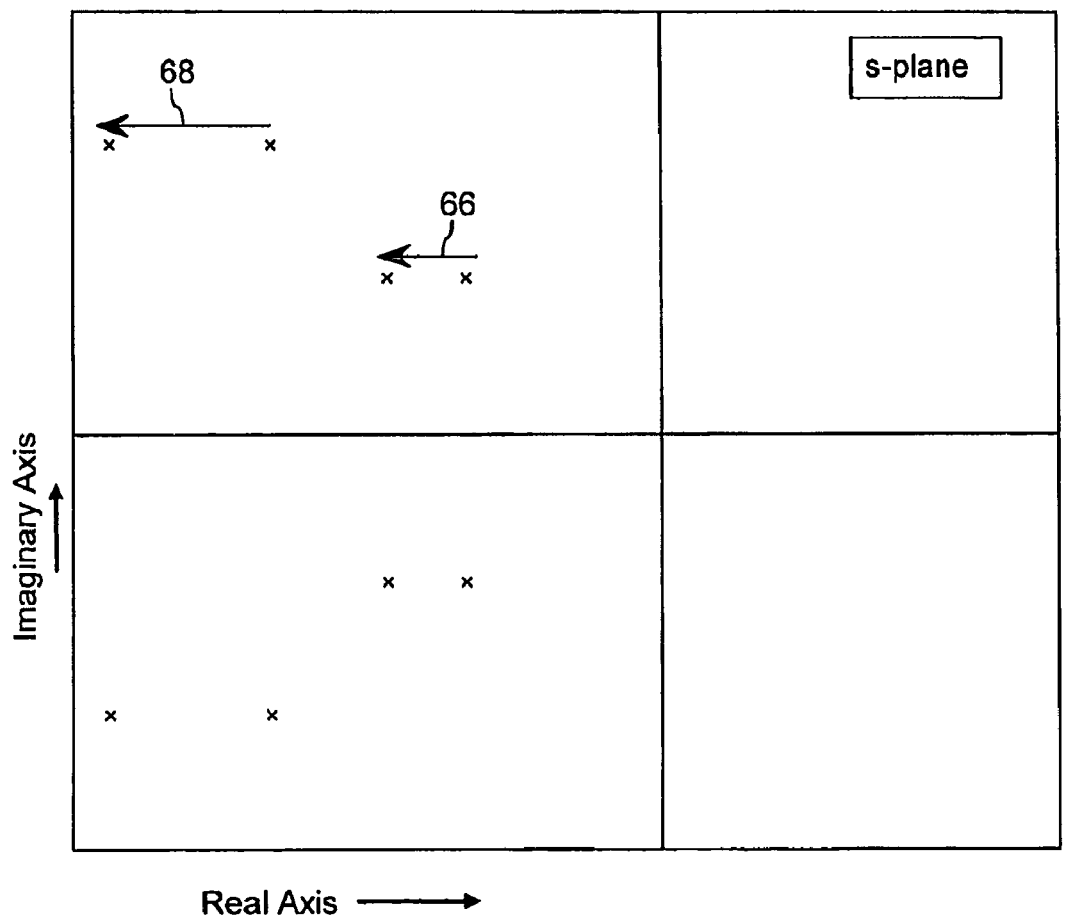
FIG. 6 graphically illustrates the impact in the complex frequency domain of a MIMO POD controller utilizing carefully selected remote PMU feedback signals for control according to an exemplary embodiment of the present disclosure.

FIG. 6 graphically illustrates a complex frequency domain of a MIMO POD controller utilizing remote PMU feedbacks according to an exemplary embodiment of the present disclosure, thus demonstrating that the damping of power oscillations can be improved substantially through proper selection of feedback signals used for the feedback control. Specifically, the POD controller of the present disclosure can be seen to stabilize not only in the first dominant mode 66, as shown in FIG. 1, but also in the second dominant mode 68. Thus, through a careful selection of the feedback signal and the corresponding controller design procedure, several dominant oscillatory modes are damped at once.

Figure 7:
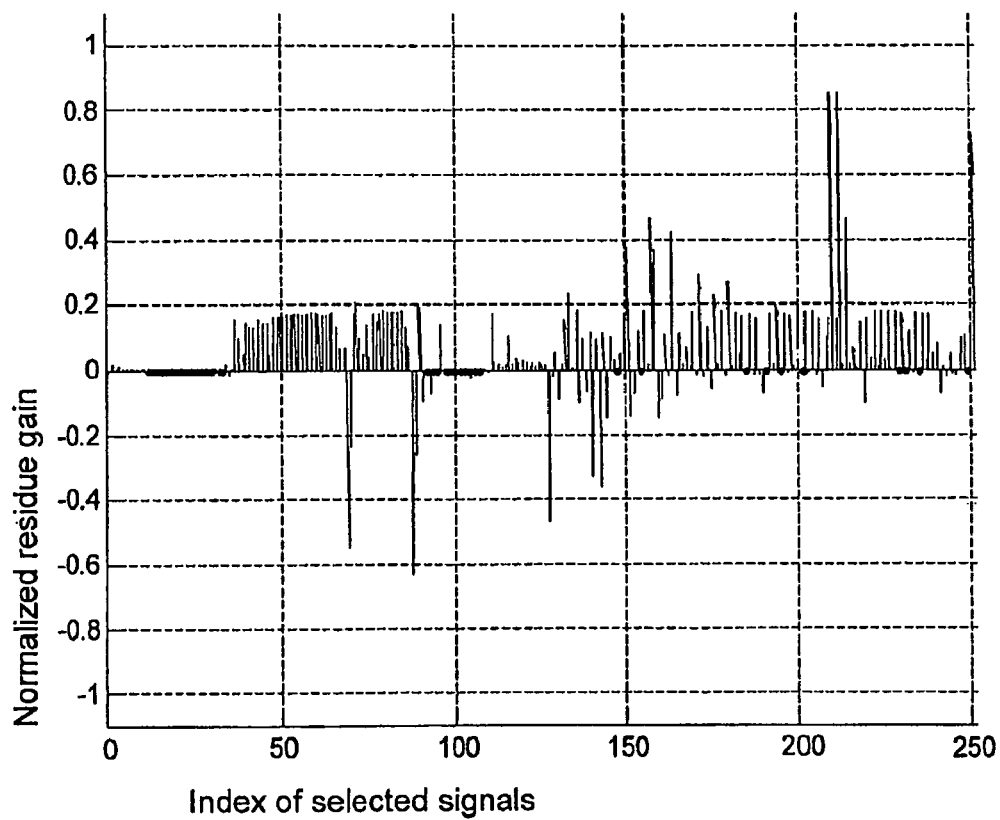
FIG. 7 shows a plot of residue gains corresponding to all available signals, including remote signals, in a power system.

The normalized residue gains of 250 selected signals are shown graphically in FIG. 7. In such a graph, the x-axis represents the index of the selected signals (1-250) and the y-axis represents the normalized residue gain. This plot of the residues—together with the Nyquist diagrams in FIGS. 4 and 5—shows that the higher the gain of the complex residue, the less gain is required from the controller (represented by the smaller the loops in the Nyquist diagrams) in order to achieve the same pole shift to the left (ie. improvement of damping). Thus, it can be seen that control solutions using signals with high residue gains are more robust. For example, the two greatest residue plots measuring 0.85 residue units of signal having the index 210 (a remote PMU signal) show that this signal is more suitable for the feedback control than the signal having the index 10 (a local signal). Hence, a correct selection of the feedback signal for control can be seen as the first step of the controller design procedure. The availability of a number of remote signals, in addition to all the available local ones, logically extends the options that a control engineer has for the selection of the feedback signals.

In an exemplary embodiment, the MIMO controller of the present disclosure may be run on a wide-area monitoring and control platform. In a further exemplary embodiment, the MIMO controller of the present disclosure may be run on a PMU.

In a further exemplary embodiment, the MIMO controller of the present disclosure may be run on a FACTS device, such as the low level power electronics control platform for the FACTS device, for example.

It will be apparent to those skilled in the art that the MIMO controller of the present disclosure may be hardwired or implemented by a processor of a computer processing device (e.g., CPU) executing a computer program recorded on a computer-readable recording medium (e.g., non-volatile memory).

A further exemplary embodiment of the present disclosure comprises a MIMO controller having only one FACTS device. With reference to the foregoing, this entails m=1, hence, RES($\lambda_k$) is a column vector. This means that one has less degree of freedom in the derivation compared to the case when m>1.

In another exemplary embodiment, it is envisaged that utilizing multiple FACTS devices to damp one mode may be possible or one input/feedback signal for multiple FACTS devices to damp several modes may be utilized. All these combinations are reflected in the considered form and dimensions of the 3 dimensional matrix RES($\lambda_k$); see the three indices i, j, k being simply limited in the search procedure during the step (4A) of the foregoing derivation.

In an alternative embodiment, the skilled person will appreciate that a different design algorithm can be used to design the underlying SISO controller layer than that one referred to in the flow diagram of FIG. 2. Also, the present disclosure may be modified to provide a SISO or SIMO or MISO arrangement, in addition to the MIMO result described above.

In an alternative exemplary embodiment, the FACTS device of the present disclosure may alternatively be replaced by a fast acting device such as an AVR or a direct load modulator, for example.

The superposition operation discussed above may alternatively be minimum sum, maximum sum or weighted sum, etc.

With reference to the flow diagram of FIG. 2, the skilled person will appreciate that the partial SISO controller (for a single mode) may be designed via alternative approaches to the one described above. For example, the so-called phasor POD approach instead of lead-lag approach can be employed. Clearly, the principle outcome remains unchanged.

However, it will be noted by the skilled person that the present disclosure is not a mere combination of several single mode damping systems. Specifically, the FACTS controller of the present disclosure does not require a steady state regulator. If any randomly selected SISO damping devices were connected in parallel and their outputs summed without the optimization/signal selection procedure, as described in FIG. 2, one would not have the MIMO damping device of present disclosure because each SISO device would not have optimal observability of the dominant mode.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of damping multiple electromagnetic oscillations in a power system, comprising:
    obtaining phasor data signals from at least one power system location;
    analyzing each oscillating mode by modal analysis;
    extracting each oscillating mode from within said signals;
    damping each oscillating mode based on the analysis; and
    applying a control signal derived from the damped oscillating mode to a power flow control device in the power system,
    wherein the step of extracting an oscillating mode comprises selecting a mode, and determining a residue having a maximal norm within a matrix of residues of the extracted mode.

2. The method according to claim 1, wherein the method comprises:
    superposing two or more damped oscillating modes to obtain a superposition signal, and
    applying a control signal derived from the superposition signal to a power flow control device in the power system.

3. The method according to claim 1, wherein the step of mode selection comprises obtaining modal controllability and modal observability.

4. The method according to claim 1, wherein each mode residue represents a product of modal controllability and modal observability.

5. A controller for damping multiple electromagnetic oscillations in a power system (G), the controller comprising:
- at least one phasor measurement unit (PMU) obtaining phasor data signals including oscillating mode signals;
- at least one power oscillation damper (POD) controller for receiving and damping each oscillating mode signal;
- a superposition means for receiving and summing the damped signals and deriving a control signal;
- a feedback controller (H) to feedback the control signal to a power flow control device in the power system (G); and
- means for extracting each oscillating mode within the phasor data signals, wherein the extracting means comprise a mode selection means and a means for determining a residue having a maximal norm within a matrix of residues of the extracted mode, respectively.

6. The controller according to claim 5, wherein the at least one power oscillation damper controller is one of a MIMO power oscillation damper controller, a SISO power oscillation damper controller, a SIMO power oscillation damper controller, and a MISO power oscillation damper controller.

7. The controller according to claim 6, wherein the controller is configured to operate on a wide-area monitoring and control platform.

8. The controller according to claim 6, wherein the controller is configured to operate on a phasor measurement unit.

9. The controller according to claim 6, wherein the controller is configured to operate on a power flow control device.

10. A computer-readable recording medium having recorded thereon a computer program for damping multiple electromagnetic oscillations in a power system, the computer program, when executed by a computer, causing the computer to carry out operations comprising:
- obtaining phasor data signals including oscillating mode signals;
- extracting each oscillating mode signal within the phasor data signals;
- receiving and damping each oscillating mode signal;
- receiving and summing the damped signals and deriving a control signal; and
- feeding back the control signal to a power flow control device in the power system,
- wherein the extracting operation comprises selecting a mode and determining a residue having a maximal norm within a matrix of residues of the extracted mode, respectively.

11. The method according to claim 2, wherein the step of mode selection comprises obtaining modal controllability and modal observability.

12. The method according to claim 3, wherein each mode residue represents a product of the modal controllability and the modal observability.

* * * * *